S. R. Niles.
Bean Harvester.
No. 80,994. Patented Aug. 11, 1868.

Witnesses.
Wm. A. Morgan
G. C. Cotton

Inventor.
S. R. Niles
per Munn & Co.
Attorneys

United States Patent Office.

S. R. NILES, OF RAWSONVILLE, MICHIGAN.

Letters Patent No. 80,994, dated August 11, 1868.

IMPROVEMENT IN BEAN-PULLER.

*The Schedule referred to in these Letters Patent and making part of the same.*

TO ALL WHOM IT MAY CONCERN:

Be it known that I, S. R. NILES, of Rawsonville, in the county of Wayne, and State of Michigan, have invented a new and improved Bean-Puller; and I do hereby declare that the following is a full, clear, and exact description thereof, which will enable others skilled in the art to make and use the same, reference being had to the accompanying drawings, forming part of this specification.

Figure 1:
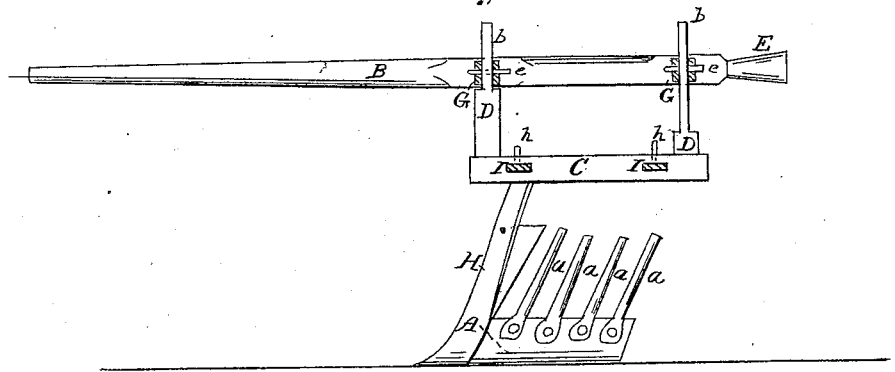
Figure 2:
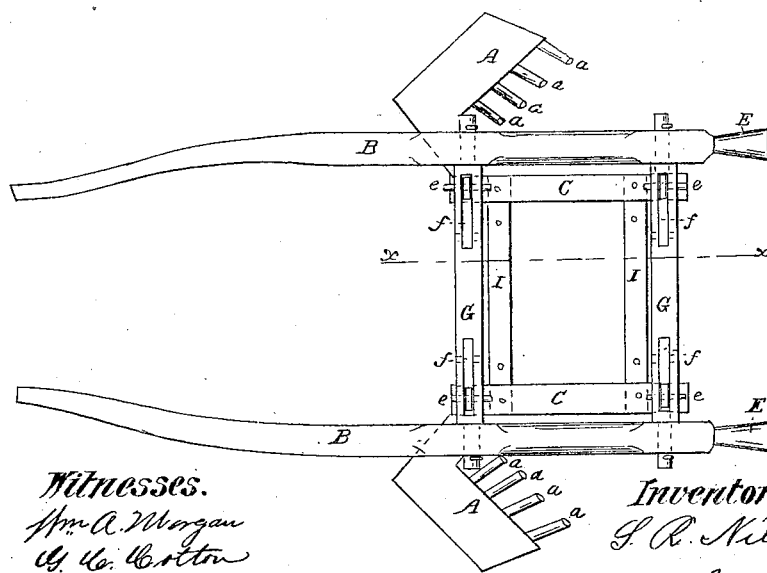

Figure 1 is a longitudinal vertical section of my invention through the line $x\ x$ of Figure 2, which latter is a top view of the same.

The object of this invention is to accomplish the scraping up or pulling of field-beans and other similar plants in a rapid and expeditious manner by the employment of horse-power.

It consists of the combination of devices set forth in the following.

In the accompanying drawings, B B are shafts, which are connected together by cross-braces G G. The frame, C C, I I, is suspended beneath these cross-pieces by four standards, D, affixed to the horizontal pieces C, the upper ends of the said standards being formed with tenons or other equivalent means for attaching the standards to the cross-braces G. When tenons are employed, the cross-braces are mortised, as shown at $f$, for the reception of the tenons $b$ and pins $e$ employed to hold them in place. The mortises are of suitable length to permit some lateral adjustment of the pieces C, to which the cutters A A are affixed; several holes being made in the cross-pieces G to admit of this adjustment.

The cross-bars I I of the frame are fitted loosely in mortises in the pieces C, and provided with holes and pins $h$, or other suitable device for being accommodated to the said lateral adjustment.

The cutters are composed of sharp shear-plates A, forming part of the uprights H, by which they are affixed to the pieces C. The shear-plates are provided with a comb or fingers, $a$.

E E are handles on the shafts, by means of which the cutters are lifted from the ground, when requisite.

In operation, two rows of beans are scraped up at once, the apparatus being drawn forward between two rows, causing the cutters to cut under the roots of the plant, which are delivered off somewhat laterally from the fingers, while the earth passes through the fingers, thus leaving the uptorn plants on the surface of the soil, and conveniently accessible for gathering.

The fingers are of iron, and are riveted or bolted to cutters of the same material.

This instrument is also available as a cultivator, as will be obvious.

I claim as new, and desire to secure by Letters Patent—

The combination of the shafts B B, shear-cutters A, having fingers $a\ a\ a$, &c., and the adjustable frame D C I, all operating substantially as shown and described, and for the purpose set forth.

S. R. NILES.

Witnesses:
 DEVERE BUTTS,
 E. S. BUTTS.